United States Patent
Miyazaki (10) Patent No.: US 7,291,992 B2
(45) Date of Patent: Nov. 6, 2007

(54) LOAD FAILURE PROTECTION CIRCUIT AND DISCHARGE LAMP DRIVING APPARATUS

(75) Inventor: Hiroyuki Miyazaki, Tokyo (JP)

(73) Assignee: Sumida Corporation, Tokyo (JP)

( * ) Notice: Subject to any disclaimer, the term of this patent is extended or adjusted under 35 U.S.C. 154(b) by 0 days.

(21) Appl. No.: 11/401,974

(22) Filed: Apr. 12, 2006

(65) Prior Publication Data
US 2006/0238939 A1    Oct. 26, 2006

(30) Foreign Application Priority Data
Apr. 20, 2005    (JP)    ............................. 2005-121820

(51) Int. Cl.
*G05F 1/00*    (2006.01)
(52) U.S. Cl. ..................... 315/307; 315/291; 315/312; 315/224; 315/209 R
(58) Field of Classification Search ................ 315/291, 315/307, 308, 224, 279, 282, 274, 312, 324, 315/323, 297, 294
See application file for complete search history.

(56) References Cited

U.S. PATENT DOCUMENTS

| | | | |
|---|---|---|---|
| 5,621,281 A * | 4/1997 | Kawabata et al. | .......... 315/307 |
| 6,359,391 B1 | 3/2002 | Li | |
| 6,498,437 B1 | 12/2002 | Chang et al. | |
| 2002/0163822 A1 | 11/2002 | Lin | |
| 2004/0212310 A1* | 10/2004 | Ito et al. | ......................... 315/77 |
| 2004/0240235 A1 | 12/2004 | Min | |
| 2004/0263092 A1 | 12/2004 | Liu | |

FOREIGN PATENT DOCUMENTS

| | | |
|---|---|---|
| EP | 1 617 712 | 1/2006 |
| JP | 2004-265868 | 9/2004 |

* cited by examiner

*Primary Examiner*—Tuyet Vo
(74) *Attorney, Agent, or Firm*—Snider & Associates; Ronald R. Snider (57) ABSTRACT

The present invention provides a load failure protection circuit and a discharge lamp driving apparatus, which can exactly detect a failure even if the failure arises in any of a plurality of discharge lamps, and can stop drive of the discharge lamp. A part of currents of corresponding CCFLs (201 and 202) flows into two bypass resistors (21a and 21b), further, a full current of the bypass resistors (21a and 21b) flows into a resistor for full current detection (22), and its voltage drop is inputted into a control IC (1) as a feedback signal. On the other hand, cathodes of Zener diodes (25a and 25b) are connected to end parts of the bypass resistors (21a and 21b) on each CCFL side. When potential of any one of the cathodes rises by a load failure, a corresponding one of the Zener diodes (25a and 25b) generates a Zener voltage for a transistor (26) to become conductive. Therefore, since a feedback signal line connected to the collector of the transistor (26) is made at the ground potential forcibly, it is decided to be a load failure by the control IC (1), and drive of the discharge lamp is stopped.

10 Claims, 6 Drawing Sheets

SECOND EXAMPLE (MODIFIED EXAMPLE)

FIG. 1
FIRST EXAMPLE

FIG.2
SECOND EXAMPLE

FIG.3 SECOND EXAMPLE (MODIFIED EXAMPLE)

FIG.4
CONVENTIONAL EXAMPLE

FIG.5 (HALF BRIDGE CIRCUIT) FIRST EXAMPLE

FIG.6
FIRST EXAMPLE (FULL BRIDGE CIRCUIT)

LOAD FAILURE PROTECTION CIRCUIT AND DISCHARGE LAMP DRIVING APPARATUS

RELATED APPLICATIONS

This application claims the priority of Japanese Patent Application No. 2005-121820 filed on Apr. 20, 2005, which is incorporated herein by reference.

BACKGROUND OF THE INVENTION

1. Field of the Invention

The present invention relates to a load failure protection circuit of a discharge lamp driving apparatus, which turns on a discharge lamp for back lighting in a liquid crystal display panel, for example, and the discharge lamp driving apparatus. In particular, the present invention relates to drastic improvement of a load failure protection circuit which enables detection of a load failure, such as a short circuit between a high-voltage side and a low-voltage side of each discharge lamp, in a discharge lamp driving apparatus which performs lighting drive of a plurality of discharge lamps.

2. Description of the Prior Art

Conventionally, for example, what make one or more cold cathode lamps (hereafter, these are called CCFL(s)) discharged and lighted simultaneously for back lighting of various kinds of liquid crystal display panels used for a liquid crystal television set and the like are known. Various apparatuses as a discharge lamp driving apparatus for that are proposed (e.g., refer to Japanese Unexamined Patent Publication No. 2004-265868).

The discharge lamp driving apparatus disclosed by the above-mentioned patent publication not only detects a current which flows through each CCFL, but also gives feedback of a voltage, equivalent to the full current value, to a control circuit. Then, this has the structure that drive of CCFLs is performed so that a sum total of currents which flow through respective CCFLs may become always fixed on the basis of this feedback voltage.

By the way, a CCFL not only needs a high voltage of about 800 V between both ends at the time of usual lighting, but also needs a high voltages which is about 2 to 2.5 times the voltage at the time of usual lighting, at the time of a lighting start. Therefore, when a damage of a CCFL, a short circuit in its connecting terminals, and the like arise, there is a possibility of causing: dielectric breakdown by rise of a secondary side voltage caused by an open state at the secondary side of a transformer used for a drive circuit; burning of the transformer by a short-circuit current being generated; and the like. Hence, it is important to consider enough circuit protection to such a load failure condition.

Nevertheless, the apparatus disclosed in the above-mentioned patent publication maintains a full current value always uniform even if some dispersion in drive currents arises in each CCFL at the time of normal operation, and can prevent a damage and a malfunctioning by an extreme current flowing into one CCFL. Hence, the apparatus is not constructed to fully respond to the above load failure conditions.

Figure 4:
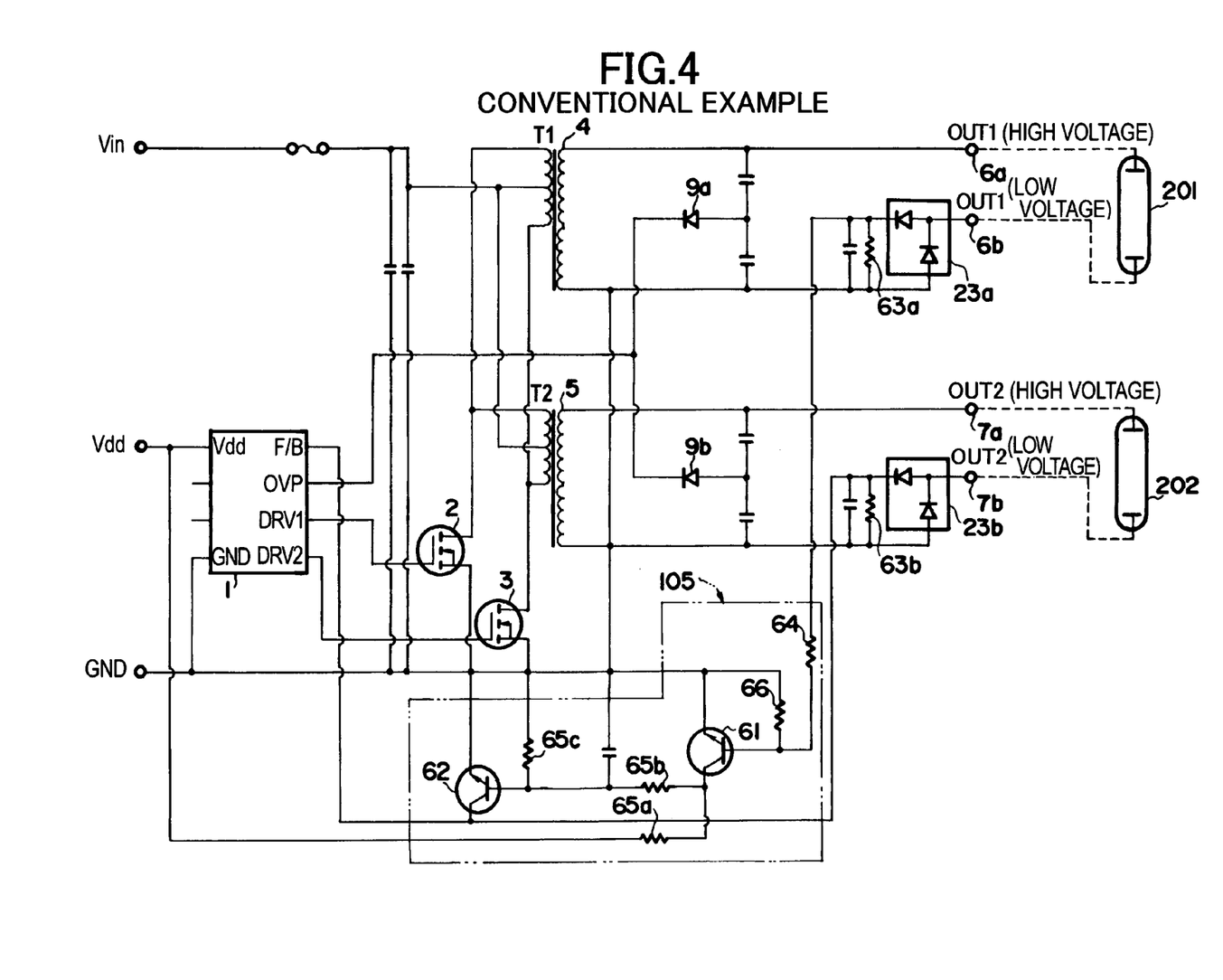
FIG. 4 is a circuit diagram showing a structural example of a conventional discharge lamp driving apparatus.
Figure 5:
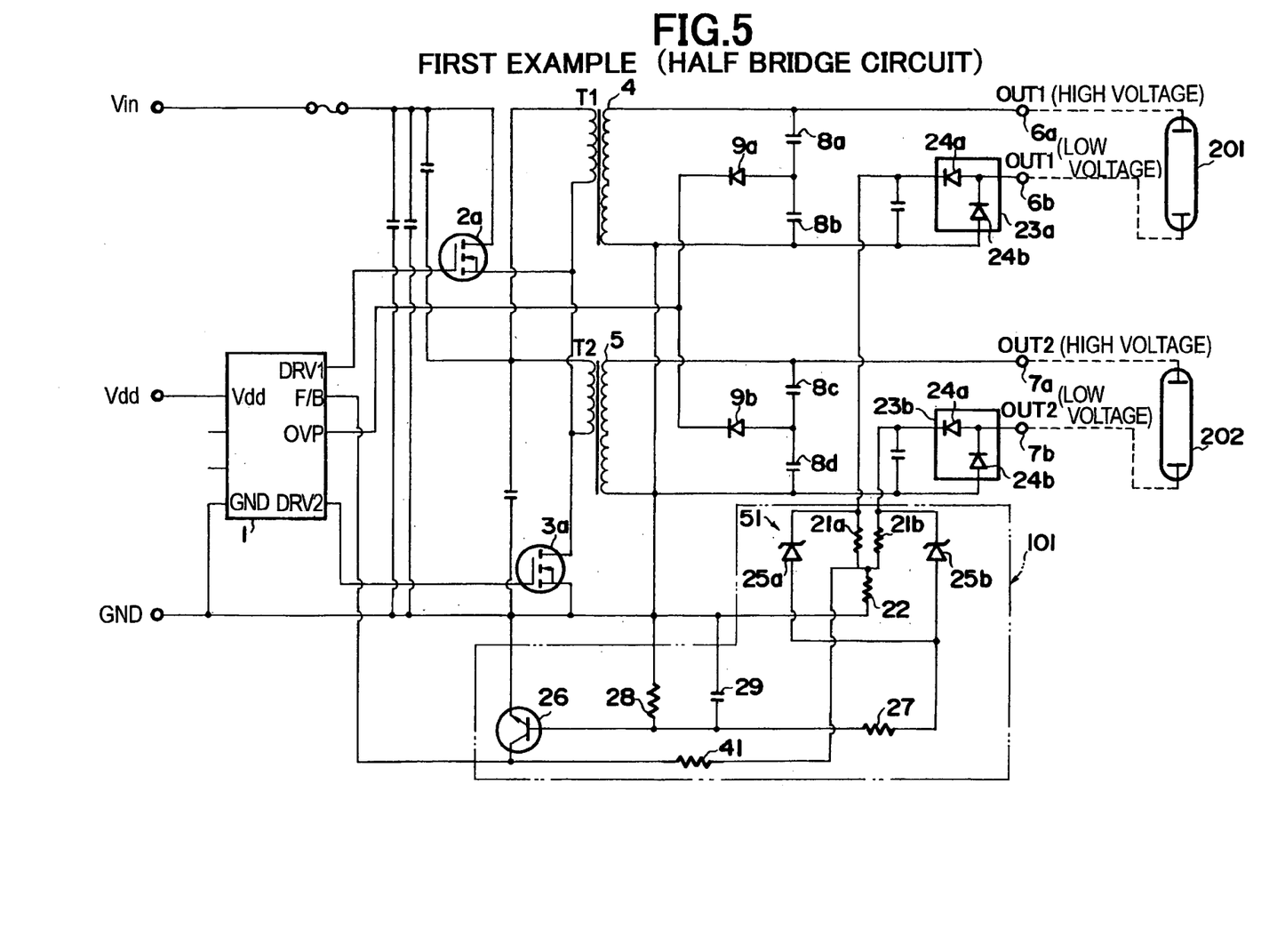
FIG. 5 is a circuit diagram showing a half bridge circuit.
Figure 6:
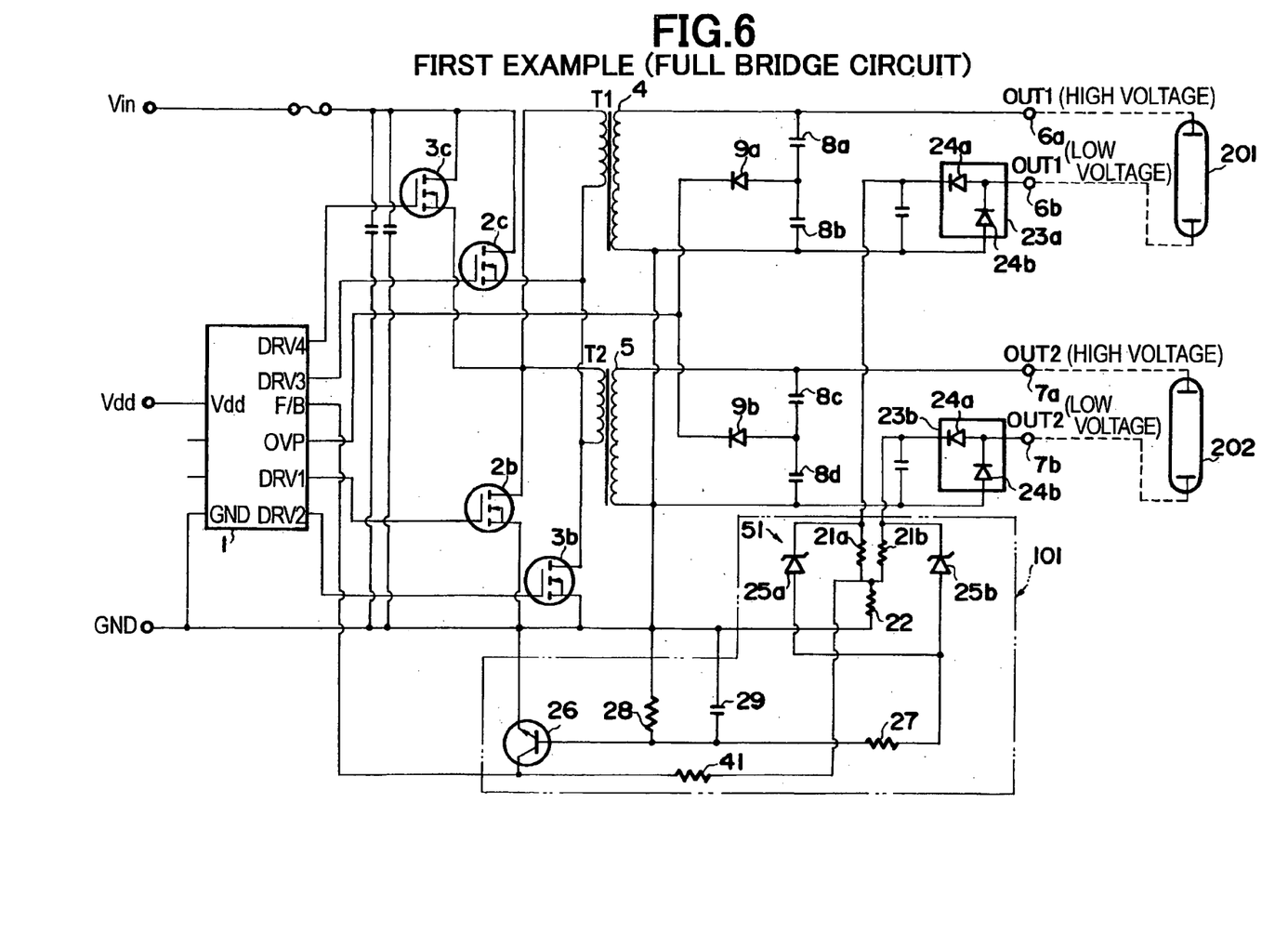
FIG. 6 is a circuit diagram showing a full bridge circuit.

What has been already proposed as a circuit which detects a load failure condition of a discharge lamp driving apparatus is, for example, a circuit having structure shown in FIG. 4.

Hereafter, the circuit (hereafter, this is called a conventional circuit) which relates to this conventional technology is outlined with referring to this diagram.

First, main components of this conventional circuit are two N channel MOSFET transistors (hereafter, these are called FETs) 2 and 3 which construct a push-pull circuit, two transformers 4 and 5, and a control IC 1 which is made an integrated circuit, and makes up an inverter-controlled drive circuit for discharge and lighting of two CCFLs 201 and 202. Furthermore, this conventional circuit is constructed so as to detect a failure between terminals to which the CCFLs 201 and 202 are connected, and to make the control IC 1 stop drive of the CCFLs 201 and 202 when a failure is detected. Hence, a tube current detector 105 which detects a failure condition is provided.

The FETs 2 and 3 which form a push pull circuit are constructed so as to be switching if driven by the control IC 1 to be able to apply AC voltages to primary sides of the transformers 4 and 5 which correspond respectively. Then, high voltages are generated in secondary sides of transformers 4 and 5, which are applied to a first CCFL 201 connected between first and second terminals 6a and 6b, and a second CCFL 202 connected between third and fourth terminals 7a and 7b respectively.

The tube current detector 105 is constructed of two NPN transistors 61 and 62 as main components, and operates so as to detect presence of an failure at the first and second terminals 6a and 6b, and the third and fourth terminals 7a and 7b to which the CCFLs 201 and 202 are connected respectively to make the control IC 1 stop drive of the CCFLs 201 and 202 when detecting an failure.

Specifically, first, in a state that the two CCFLs 201 and 202 are operating normally, voltages according to currents which flow through the CCFLs 201 and 202 respectively are obtained by rectification circuits 23a and 23b, and resistors 63a and 63b which are connected to these rectification circuits 23a and 23b in parallel. Then, a voltage according to a current which flows through the first CCFL 201 connected between the first and second terminals 6a and 6b is applied to a base of a transistor 61 through a resistor 64. In addition, a resistor 66 is connected between a base and an emitter of the transistor 61. On the other hand, a voltage according to a current which flows through the second CCFL 202 connected between the third and fourth terminals 7a and 7b is applied to a feedback terminal F/B of the control IC 1. Nevertheless, a collector of the transistor 62 is connected to this voltage line.

Hence, at the time of CCFL normal operation, the transistor 61 is made a conductive state by the voltage applied to its base, and the base of the transistor 62 is made almost ground potential. Hence, the transistor 62 becomes a nonconductive state. Therefore, a predetermined rectification voltage obtained by the rectification circuit 23b is applied to the feedback terminal F/B of the control IC 1 as it is.

Then, in a state that the predetermined rectification voltage is applied to the feedback terminal F/B, the control IC 1 consecutively drives the CCFLs 201 and 202 as operation of the CCFLs 201 and 202 being normal.

On the other hand, in the case of a load failure, for example, the first terminal 6a being grounded by a certain cause, a current does not flow between the first and second terminals 6a and 6b. Hence, a base voltage of the transistor 61 becomes almost 0 V, and the transistor 61 becomes a nonconductive state. Thereby, a predetermined voltage Vdd which is also a supply voltage of the control IC 1 is applied to the base of the transistor 62 with being divided by resistors 65a, 65b, and 65c. Hence, the transistor 62 becomes a conductive state, and ground potential is applied to the feedback terminal F/B of the control IC 1.

As a result, the control IC 1 is judged to be a load failure and stop the drive of the CCFLs 201 and 202.

As load failures, besides the above-mentioned short circuit of a high-voltage side terminal to a ground side, there is, for example, a case that the CCFL 201 or 202 is damaged by a certain cause so that the first terminal 6a and second terminal 6b become an open state, or the third terminal 7a and fourth terminal 7b become an open state.

In this case, a function of detecting such an open state and stopping the drive of the CCFLs 201 and 202 is added to the control IC 1. Specifically, secondary side voltages of the transformers 4 and 5 which are given capacitor division are applied to an open state voltage detection terminal OVP of the control IC 1 through a first diode 9a for open state voltage detection, or a second diode 9b for open state voltage detection. Then, when this applied voltage is judged to be beyond a predetermined value, the drive of the CCFLs 201 and 202 is stopped as inter-terminal open.

By the way, as load failures, besides the above-mentioned, a short circuit between a high voltage terminal and a low voltage terminal may be cited. For example, this is a case that anything intervenes by a certain cause between the first terminal 6a and second terminal 6b, and thereby, an overcurrent flows between terminals. Since such an overcurrent causes not only fuming and firing of the transformers 4 and 5, but also fuming and firing of other electronic parts, it is necessary to detect it surely, and to cut off the current.

Nevertheless, the above-described tube current detector 105 cannot detect surely this short circuit between a high voltage terminal and a low voltage terminal. That is, since a short-circuit current flows when the short circuit between the high voltage terminal and low voltage terminal occurs, a voltage which is sufficient for making the transistor 61 into a conductive state is applied to the base of the transistor 61. Hence, the transistor 61 becomes a conductive state, and on the other hand, the transistor 62 becomes a nonconductive state. Therefore, since the predetermined rectification voltage obtained by the rectification circuit 23b similarly at the time of normal operation is applied to the feedback terminal F/B of the control IC 1, the control IC 1 consecutively drive the CCFLs 201 and 202 in spite of the load failure.

In this way, a conventional circuit has structure of representing a voltage signal, obtained from one CCFL in the plurality of CCFLs 201 and 202, as a feedback signal offered in order to stop the drive of the CCFLs 201 and 202 in the case of a load failure arising, and deciding only presence of a tube current for the remaining CCFL. Hence, there was a problem that it was not possible to decide to be a load failure in a control circuit even if a short circuit between the high voltage side and low voltage side arose in the CCFL which did not generate the feedback signal, and it was not possible to perform preventive measures against the fuming, firing, and the like of a transformer, and the like resulting from the load failure and the like surely.

SUMMARY OF THE INVENTION

The present invention was made in view of such a situation, and aims at providing a load failure protection circuit and a discharge lamp driving apparatus, which not only can stop drive surely even if any discharge lamp is malfunctioned, but also can detect a short circuit state between a high voltage side and low voltage side of the discharge lamp securely as a load failure, in a discharge lamp driving apparatus which drives a plurality of discharge lamps.

A load failure protection circuit of the present invention is a load failure protection circuit in a discharge lamp driving apparatus which is constructed so as not only to drive a plurality of discharge lamps on the basis of a feedback signal according to a drive state of the discharge lamps, but also to stop drive of the discharge lamps when the feedback signal becomes a predetermined voltage corresponding to a load failure.

The load failure protection circuit concerned is characterized in being equipped with:

bypass resistors which are provided corresponding each of the plurality of discharge lamps, and which bypass a part of currents which flows through the corresponding discharge lamps;

a resistor for full current detection into which currents which flow through the bypass resistors are made to flow; and a signal voltage setting circuit which not only outputs a voltage at a common junction of the bypass resistors and the resistor for full current detection as the feedback signal, but also makes the feedback signal forcibly be a predetermined voltage corresponding to the load failure when any voltage at end parts of the bypass resistors in the discharge lamp sides respectively becomes beyond a predetermined value.

The above-mentioned signal voltage setting circuit is provided for each of the above-mentioned bypass resistors. And, the signal voltage setting circuit is preferably equipped with Zener diodes whose cathodes are connected to end parts of the bypass resistors corresponding in discharge lamp sides respectively, and whose anodes are mutually connected to other anodes, and a semiconductor device which is made to be in a conductive state by a Zener voltage when the Zener voltage arises in at least one of the above-mentioned Zener diodes, and is provided so as to make the above-mentioned common junction be at a predetermined voltage corresponding to a load failure.

In this case, it is preferable that the above-mentioned semiconductor device is constructed of a first transistor, and has construction of:

that a base of the above-mentioned first transistor is connected to each anode of the above-mentioned Zener diodes through a first resistor;

that an emitter of the above-mentioned first transistor is connected to a ground side;

that a collector of the above-mentioned first transistor is connected through a second resistor to a feedback signal terminal of a control IC and the above-mentioned common junction; and that a third resistor and a capacitor are connected mutually in parallel between the base of the above-mentioned first transistor and the above-mentioned ground side.

In addition, in this case, it is preferable that the above-mentioned signal voltage setting circuit is provided corresponding to each of the above-mentioned bypass resistors; and comprises:

diodes, anodes of which are respectively connected to discharge lamp side end parts of the bypass resistors corresponding, and cathodes of which are mutually connected; and a comparator provided so that the above-mentioned common junction may be made into a predetermined voltage corresponding to a load failure when a voltage obtained through a diode is a predetermined voltage larger than a voltage obtained at the time of normal operation of a discharge lamp.

On the other hand, it is preferable:

that an inverting input terminal of the above-mentioned comparator is connected to each cathode of the above-mentioned diodes through fourth and fifth resistors;

that a non-inverting input terminal of the above-mentioned comparator is connected to a reference voltage terminal of a control IC;

that an output terminal of the above-mentioned comparator is connected to a feedback signal terminal of the above-mentioned control IC and the above-mentioned common junction;

that a sixth resistor is connected between the above-mentioned inverting input terminal and a ground side; and that a seventh resistor is connected between the above-mentioned non-inverting input terminal and the ground side.

In addition, in this case, it is preferable:

that the load failure protection circuit has a dimming circuit which is constructed so as to be able to make amplitude of a feedback signal in the above-mentioned feedback signal terminal variable according to a dimming signal from the external;

that the dimming circuit comprises a first diode, an eighth resistor, a ninth resistor, and a second transistor, and has such structure of:

that a collector of the above-mentioned second transistor is connected to a supply voltage application terminal of the above-mentioned control IC;

that an emitter of the above-mentioned second transistor is connected to one end of the above-mentioned eighth resistor;

that another end of the above-mentioned eighth resistor is connected to an anode of the above-mentioned first diode;

that a cathode of the above-mentioned first diode is connected to a feedback signal terminal of the above-mentioned control IC; and that a dimming signal is applied to a base of the above-mentioned second transistor from the external through the above-mentioned ninth resistor; and that the above-mentioned comparator and a tenth resistor are connected mutually in parallel between the above-mentioned common junction and the feedback signal terminal of the above-mentioned control IC.

In addition, a discharge lamp driving apparatus of the present invention is characterized in comprising any one of the load failure protection circuits which are mentioned above.

Furthermore, it is preferable that such a discharge lamp driving apparatus comprises any one of a push pull circuit, a half bridge circuit and a full bridge circuit, which each convert a DC voltage supplied from the external into an AC voltage.

DESCRIPTION OF THE PREFERRED EMBODIMENTS

Hereafter, a discharge lamp driving apparatus according to embodiments of the present invention will be described with referring to FIGS. 1 to 3.

First, a first structural example will be explained with referring to FIG. 1.

Figure 1:
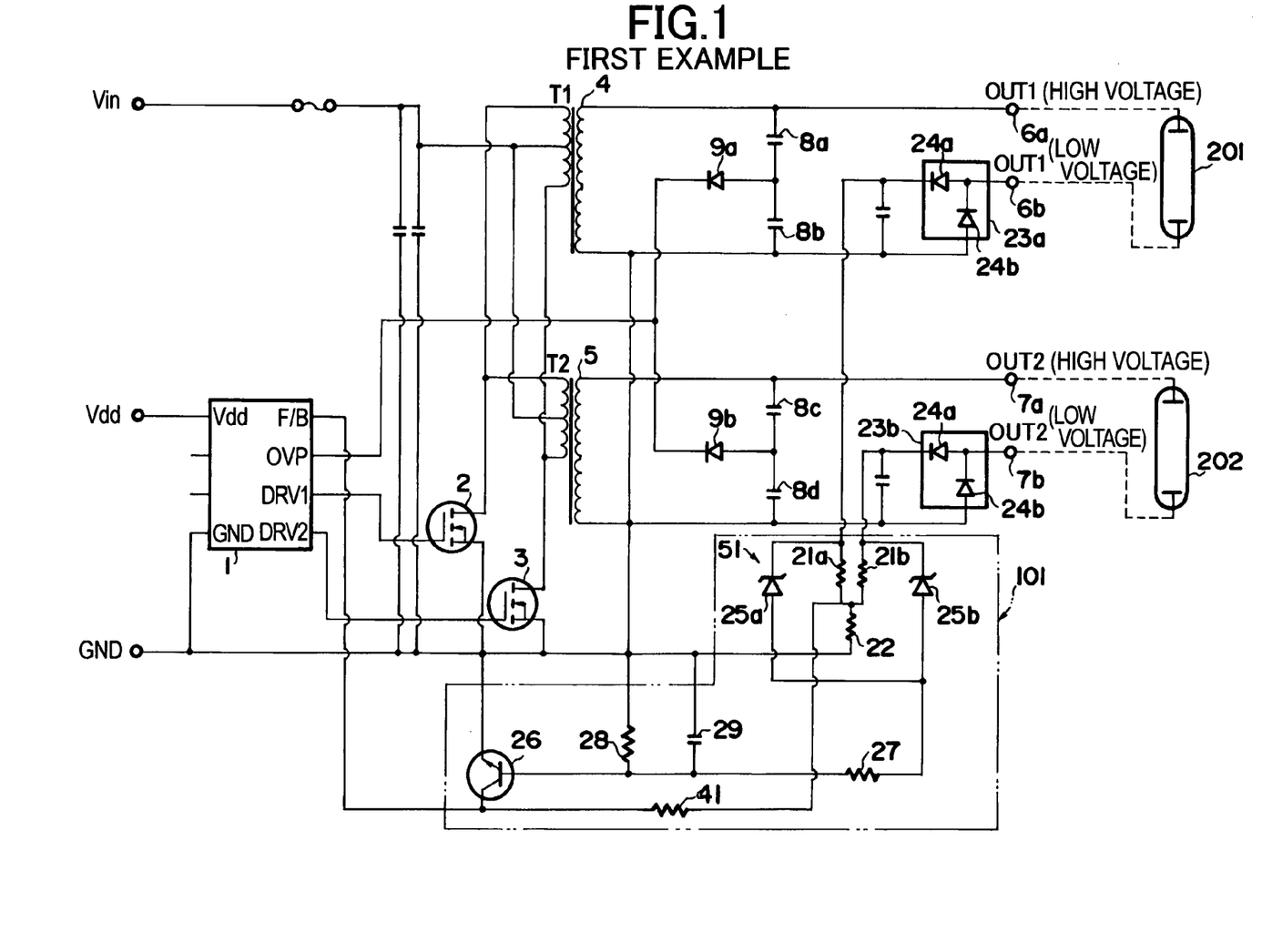
FIG. 1 is a circuit diagram showing a structural example of a discharge lamp driving apparatus according to a first embodiment of the present invention.

FIG. 1 is a schematic diagram showing a first circuit-structural example of a discharge lamp driving apparatus according to an embodiment of the present invention. In addition, the same reference numerals are assigned to the same components as those of the conventional apparatus shown in the previous FIG. 4.

In this diagram, fundamental structure of the discharge lamp driving apparatus is the same as that of this type of driving apparatus, which is well known from before, except a part of a load failure protection circuit 101 mentioned later.

That is, the discharge lamp driving apparatus in an embodiment of the present invention makes it possible to perform drive control of two CCFLs 201 and 202. And main components of the discharge lamp driving apparatus are a control IC 1, which is made an integrated circuit, two N channel FETs 2 and 3 as switching devices, and two transformers 4 and 5. This discharge lamp driving apparatus further comprises a load failure protection circuit 101.

The FETs 2 and 3 form a push pull circuit which converts a DC voltage (Vin) supplied from the external into an AC voltage. They function as a push pull circuit to the two transformers 4 and 5, respectively.

Then, these two FETs 2 and 3 are given switching drive by the control IC 1 to perform switching operation so that predetermined high-frequency voltages may be applied to primary sides of the transformers 4 and 5. Then, each of the transformers 4 and 5 boosts the voltage in this primary side to generate a high voltage in its secondary side.

Terminals to which the CCFLs 201 and 202 are connected respectively are provided in the secondary sides of the transformers 4 and 5. That is, first and second terminals 6a and 6b are connected to a secondary side of one transformer 4, and third and fourth terminals 7a and 7b are connected to a secondary side of another transformer 5, respectively. A first CCFL 201 and a second CCFL 202 are connected between respective terminals.

In addition, in this example, the first terminal 6a is made to be in a high voltage side, and is denoted as "OUT1 (high voltage)" in FIG. 1 for convenience, and the second terminal 6b is made to be in a low voltage side, and is denoted as "OUT1 (low voltage)" in FIG. 1 for convenience. In addition, similarly, the third terminal 7a is made to be in a high voltage side, and is denoted as "OUT2 (high voltage)" in FIG. 1 for convenience, and the fourth terminal 7b is made to be in a low voltage side, and is denoted as "OUT2 (low voltage)" in FIG. 1 for convenience.

The control IC 1 is constructed so as to output drive signals, required in order to perform switching drive of the FETs 2 and 3, to the FET 2 and 3, to monitor a feedback signal mentioned later, and to stop the drive of the FETs 2 and 3 when the signal changes into a state corresponding to a predetermined load failure. In addition, the drive signals for the FETs 2 and 3 are outputted from terminals which are denoted as "DRV1" and "DRV2" in FIG. 1. In addition, the feedback signal is inputted into a terminal (hereafter, this is called a feedback signal terminal) which is denoted as "F/B" similarly. The control IC 1 in the embodiment of the present invention is constructed so as to operate so that the feedback signal may become a predetermined value by increasing or decreasing currents of the CCFLs 201 and 202 by lengthening or shortening switching-on periods for the FETs 2 and 3 according to rise or fall when a voltage rises or falls rather than that at the time of the normal unless the feedback signal becomes a predetermined voltage corresponding to a load failure.

Furthermore, since an output voltage rises when the feedback signal terminal F/B becomes GND potential (when there is no F/B signal), this control IC 1 is made to be a quenching state by an OVP function which this circuit has. When the output voltage rises, the voltage is inputted into a predetermined terminal of the control IC 1, i.e., in this example, a terminal denoted as "OVP" (open state voltage detection terminal OVP). More specifically, as for one transformer 4, a voltage given by voltage division of first and second capacitors 8a and 8b, as for another transformer 5, a voltage given by voltage division of third and fourth capacitors 8c and 8d, are inputted into the open state voltage detection terminal OVP of the above-mentioned control IC 1 through a first diode 9a for open state voltage detection and a second diode 9b for open state voltage detection respectively. Then, the control IC 1 is constructed to stop the drive of the CCFLs 201 and 202 when this voltage becomes a predetermined value or more.

In addition, a supply voltage Vdd is applied to the control IC 1 from the external.

The load failure protection circuit 101 is constructed of first and second bypass resistors 21a and 21b, a resistor 22 for full current detection, and a signal voltage setting circuit 51 as main components. Although details will be described later, the load failure protection circuit 101 is constructed so as to detect a load failure between the first and second terminals 6a and 6b or between the third and fourth terminals 7a and 7b, and to output a predetermined feedback signal to the control IC 1.

Hereafter, the load failure protection circuit 101 will be explained specifically. When explaining circuit connection first, in this structural example, the first and second bypass resistors 21a and 21b are first provided with corresponding to the two CCFLs 201 and 202.

One end of the first bypass resistor 21a is connected to the second terminal 6b through the first rectification circuit 23a, and, one end of the second bypass resistor 21b is connected to the fourth terminal 7b through the second rectification circuit 23b.

Here, the first and the second rectification circuits 23a and 23b have the same structure, and specifically, are constructed using two rectifier diodes 24a and 24b. Then, one rectifier diode 24a is provided in a state that its anode is connected to the second terminal 6b or the fourth terminal 7b, and its cathode is connected to one end of the first bypass resistor 21a, or one end of the second bypass resistor 21b. In addition, as for another rectifier diode 24b, its anode is connected to a transformer 4 or transformer 5 side, and its cathode is connected to the second terminal 6b or fourth terminal 7b, respectively.

Then, other ends of the first and second bypass resistors 21a and 21b are connected to one end of the resistor 22 for full current detection. This common junction of the first and second bypass resistors 21a and 21b, and the resistor 22 for full current detection is connected to a collector of the transistor 26, which forms the signal voltage setting circuit 51 described below, and the feedback signal terminal F/B of the control IC 1 through a resistor 41. In addition, another end of the resistor 22 for full current detection is connected to a ground side (GND).

The signal voltage setting circuit 51 is constructed of first and second Zener diodes 25a and 25b, and the NPN transistor 26 as main components. Although details will be described later, the signal voltage setting circuit 51 is constructed so as to make a voltage of the common junction of the first and the second bypass resistors 21a and 21b, and the resistor 22 for full current detection a predetermined voltage corresponding to a load failure forcibly when a voltage of either end of the first and second bypass resistors 21a and 21b in CCFLs 201 and 202 sides, in other words, one of end parts to which the first rectification circuit 23a, and the second rectification circuit 23b are connected becomes a predetermined value.

Specifically, first, anodes of the first and second Zener diodes 25a and 25b not only are mutually connected but also are connected to a base of the transistor 26 through a first base resistor 27. An emitter of this transistor 26 is connected to the ground side.

On the other hand, a cathode of the first Zener diode 25a is connected to one end of the first bypass resistor 21a, i.e., an end part to which the first rectification circuit 23a is connected. In addition, a cathode of the second Zener diode 25b is connected to one end of the second bypass resistor 21b, i.e., an end part to which the second rectification circuit 23b is connected.

In addition, between the base of the transistor 26 and the ground side, a first bias resistor 28 and a first capacitor 29 are connected in parallel.

Next, operation in the above-mentioned structure will be explained in particular with focusing on operation of the load failure protection circuit 101.

First, when a state that the CCFLs 201 and 202 are driven normally will be explained. In this case, parts of currents which flow through the CCFLs 201 and 202 through the rectification circuits 23a and 23b are bypassed, and flow into the first bypass resistor 21a and the second bypass resistor 21b, respectively. Then, a synthetic current of a predetermined current which flows into the first bypass resistor 21a, and a predetermined current which flows into the second bypass resistor 21b flows into the resistor 22 for full current detection.

Therefore, voltage drops with amplitude according to the currents which flow respectively arise in the first and second bypass resistors 21a and 21b, and the resistor 22 for full current detection.

Here, cathode potential of the first Zener diode 25a is equal to a sum of the respective voltage drops of the first bypass resistor 21a and resistor 22 for full current detection. In addition, cathode potential of the second Zener diode 25b is equal to a sum of the respective voltage drops of the second bypass resistor 21b and resistor 22 for full current detection. At the time of normal operation of the CCFLs 201 and 202, resistance of the first and second bypass resistors 21a and 21b, and the resistor 22 for full current detection is beforehand set so that this cathode potential of the first and second Zener diodes 25a and 25b may become equal to or less than a Zener voltage. Hence, the first and second Zener diodes 25a and 25b are kept to be nonconductive state without starting Zener operation.

Therefore, since a base voltage of the transistor 26 becomes almost 0 V, the transistor 26 becomes a nonconductive state. Hence, potential of a connection line of the common junction of the first and second bypass resistors 21a and 21b and the resistor 22 for full current detection, and the feedback signal terminal F/B of the control IC 1 is made to be in a state of being not affected by the transistor 26 at all. Hence, a voltage by the voltage drop in the resistor 22 for full current detection at the time of normal operation is inputted into the feedback signal terminal F/B of the control IC 1. When the voltage is inputted, the control IC 1 decides that the operation of the CCFLs 201 and 202 is normal, and drive operation is continued.

Next, assuming as a case, where a state of a load failure arises, for example, that the first terminal 6a short-circuits with the ground side because of a certain cause, operation in that case will be explained below.

Since a current does not flow into the second terminal 6b when the first terminal 6a short-circuits with the ground side, a current flow from the first rectification circuit 23a to the first bypass resistor 21a becomes zero.

Hence, only a current from the second rectification circuit 23b flows into the resistor 22 for full current detection through the second bypass resistor 21b. But, since the current which flows into the second bypass resistor 21b is comparable with that at the time of the normal, a voltage drop in the resistor 22 for full current detection becomes about a half the normal just after a load failure arises. Hence, a voltage inputted into the feedback signal terminal F/B of the control IC 1 also becomes about a half the normal.

Therefore, the control IC 1 switches the FETs 2 and 3 so that a current, which is twice the normal into the second bypass resistor 21b, that is, which is equivalent to a sum of the current which flows into the first bypass resistor 21a at the time of the normal, and the current which flows into the second bypass resistor 21b, may flow into the second bypass resistor 21b. As a result, a current which is about two times larger than the normal flows into the second bypass resistor 21b. Then, at that time, since cathode potential of the second Zener diode 25b is set so as to exceed the Zener voltage, the second Zener diode 25b becomes conductive, and a voltage equivalent to the Zener voltage is applied to the base of the transistor 26.

The transistor 26 becomes a conductive state by application of the Zener voltage to its base. Potential of the connection line of the common junction of the first and the second bypass resistors 21a and 21b and the resistor 22 for full current detection, and the feedback signal terminal F/B of the control IC 1 is made to be the ground potential through the transistor 26. Then, since the feedback signal terminal F/B becomes the ground potential, the control IC 1 decides to be a load failure, and stops the switching drive of the FETs 2 and 3, and hence, the CCFLs 201 and 202 are made into a stop state forcibly.

Next, as a case that a load failure state arises, for example, a case that because of a certain cause, anything intervenes between the first terminal 6a and second terminal 6b, and a short circuit state between both terminals arises will be explained.

In this case, a very large current in comparison with the normal flows between the first terminal 6a and second terminal 6b by a short circuit. Simultaneously, it flows also into the first bypass resistor 21a.

In consequence, since cathode potential of the first Zener diode 25a exceeds the Zener voltage, the first Zener diode 25a becomes conductive, and a voltage equivalent to the Zener voltage is applied to the base of the transistor 26.

After all, also in this case, similarly to the case that the first terminal 6a short-circuits with the ground side, the transistor 26 becomes conductive and the feedback signal terminal F/B of the control IC 1 becomes the ground potential. Then, the control IC 1 decides to be a load failure, stops the switching drive of the FETs 2 and 3, and makes the CCFLs 201 and 202 into a stop state forcibly.

In addition, also a case that the third and fourth terminals 7a and 7b short-circuits with each other performs operation fundamentally similar to the above-described operation, and hence, second detailed explanation of the case is omitted here.

Furthermore, as a load failure, a case that either of the CCFLs 201 and 202 is damaged will be explained as a case that connection between the first and second terminals 6a and 6b, or connection between the third and fourth terminals 7a and 7b becomes an open state.

That is, for example, assuming that connection between the first and second terminals 6a and 6b becomes an open state, and connection between the third and fourth terminals 7a and 7b is normal, in this case, as circuit operation, a current in the first bypass resistor 21a becomes zero, and a current flows only in the second bypass resistor 21b. This is in a state similar to such an above-described load failure that the first terminal 6a and the ground side become a short circuit state. In consequence, although second detailed explanation is omitted, the feedback signal terminal F/B of the control IC 1 becomes the ground potential, and the drive of the CCFLs 201 and 202 is stopped.

In addition, when connections between the first and second terminals 6a and 6b and between the third and fourth terminals 7a and 7b change into an open state, a current flows into neither the first bypass resistor 21a nor the second bypass resistor 21b. Hence, a current does not flow also into the resistor 22 for full current detection.

In consequence, also in this case, the feedback signal terminal F/B of the control IC 1 becomes almost the ground potential, and the drive of the CCFLs 201 and 202 is stopped.

Next, a load failure protection circuit 102 in a second structural example will be explained with referring to FIG. 2. In addition, the same reference numerals are assigned to components the same as the components shown in FIG. 1, and their detailed explanation is omitted. Hereafter, explanation will be performed with focusing on different points.

First, circuit connection will be explained.

In this load failure protection circuit 102, especially structure of a signal voltage setting circuit 52 differs from the structural example shown in the above-mentioned FIG. 1.

Hereafter, when explanation is performed with focusing on this signal voltage setting circuit 52, first, this signal voltage setting circuit 52 is constructed of first and second diodes 31a and 31b, and a comparator 32 as main components.

In this structural example, a junction of the first and second bypass resistors 21a and 21b and the resistor 22 for full current detection, and a junction of these and the control IC 1 are the same as those of the first structural example shown in FIG. 1.

An anode of the first diode 31a is connected to an end part of the first bypass resistor 21a in a CCFL 201 side, and an anode of the second diode 31b is connected to an end part of the second bypass resistor 21b in a CCFL 202 side, respectively. On the other hand, a cathode of the first diode 31a and a cathode of the second diode 31b are connected through a resistor 42 and a resistor 43 respectively to an inverting input terminal of the comparator 32 together.

In addition, the common junction of the first and second bypass resistors 21a and 21b, and the resistor 22 for full current detection is connected to the feedback signal terminal F/B of the control IC 1, and an output terminal of the comparator 32 similarly to the structural example shown in FIG. 1.

Then, a non-inverting input terminal of the comparator 32 is connected to a reference voltage terminal Vref of the control IC 1, and a predetermined reference voltage is applied from the control IC 1. Here, amplitude of a voltage outputted from the reference voltage terminal Vref of the control IC 1 can be adjusted by an external resistor which is connected to the control IC 1 and is not shown.

Furthermore, resistors 33 and 34 are connected between the inverting input terminal of the comparator 32 and the ground side, and between the non-inverting input terminal and the ground side, respectively.

Next, operation in this structure will be explained.

First, a state that the CCFLs 201 and 202 are driven normally will be explained. In this case, first, a respect that a predetermined current flows into the first and second bypass resistors 21a and 21b from the first and second rectification circuits 23a and 23b is similar to that explained in the structural example shown in FIG. 1.

Then, since potential of the anode sides of the first and second diodes 31a and 31b exceeds a voltage which makes a diode conductive state, all the first and second diodes 31a and 31b become a conductive state. Hence, a voltage which is lower by voltage drops, generated in the diodes 31a and 31b, than the voltages in the anode sides of the first and second diodes 31a and 31b is applied to the inverting input terminal of the comparator 32.

Here, a reference voltage applied to the non-inverting input terminal of the comparator 32 is set at a value slightly higher than the above-described voltage applied to the inverting input terminal at the time of normal operation of the CCFLs 201 and 202. Hence, the comparator 32 becomes an output state equivalent to a logic value High. But, the output terminal is connected to the common junction of the first and second bypass resistors 21a and 21b, and the resistor 22 for full current detection. Hence, an output voltage of the comparator 32 in this case becomes a voltage of the common junction of the first and second bypass resistors 21a and 21b, and the resistor 22 for full current detection.

As a result, the voltage of the common junction of the first and second bypass resistors 21a and 21b, and the resistor 22 for full current detection is applied to the feedback signal terminal F/B of the control IC 1. Then, when the voltage is inputted, the control IC 1 decides that the operation of the CCFLs 201 and 202 is normal, and drive operation is continued.

Next, operation at the time when the first terminal 6a short-circuits with the ground side because of a certain cause will be explained as a load failure.

In this case, while a current of the first bypass resistor 21a becomes zero, similarly to that explained in the structural example of FIG. 1, a current which is about two times the current at the time of the normal flows into the second bypass resistor 21b by the drive control of the control IC 1.

As a result, a voltage applied to the inverting input terminal of the comparator 32 through the second diode 31b exceeds the reference voltage of the non-inverting input terminal securely, and an output of the comparator 32 becomes a state of the logic value Low. That is, the feedback signal terminal F/B of the control IC 1 is made into almost the ground potential. Hence, the control IC 1 decides to be a load failure to stop the drive of the CCFLs 201 and 202.

Next, as a load failure, for example, a case that because of a certain cause, anything intervenes between the first terminal 6a and second terminal 6b, and a short circuit state between both terminals arises will be explained.

In this case, it is the same as that in the case of the above-mentioned first structural example that a very large current in comparison with the normal flows between the first terminal 6a and second terminal 6b by a short circuit, and simultaneously, it flows also into the first bypass resistor 21a.

As a result, the potential in the anode side of the first diode 31a becomes larger than the potential at the time of the normal. Hence, a voltage exceeding the reference voltage of the non-inverting input terminal is applied to the inverting input terminal of the comparator 32 through the first diode 31a.

Hence, the output of the comparator 32 becomes the state of the logic value Low, and the feedback signal terminal F/B of the control IC 1 is made into almost the ground potential, and the drive of the CCFLs 201 and 202 is stopped.

Also a case that the third and fourth terminals 7a and 7b short-circuits with each other performs operation fundamentally similar to this operation, and hence, second detailed explanation of the case is omitted here.

In addition, as a load failure, a case that connection between the first and second terminals 6a and 6b, or connection between the third and fourth terminals 7a and 7b become an open state is conceivable. But, in this case, similarly to that explained in the first structural example, for example, assuming that connection between the first and second terminals 6a and 6b becomes an open state, and connection between the third and fourth terminals 7a and 7b is normal, in this case, as circuit operation, a current in the first bypass resistor 21a becomes zero, and a current flows only in the second bypass resistor 21b. This is in a state similar to such an above-described load failure that the first terminal 6a and the ground side become a short circuit state. In consequence, although second detailed explanation is omitted, the feedback signal terminal F/B of the control IC 1 becomes the ground potential, and the drive of the CCFLs 201 and 202 is stopped.

Moreover, when connections between the first and second terminals 6a and 6b and between the third and fourth terminals 7a and 7b change into an open state, a current flows into neither the first bypass resistor 21a nor the second bypass resistor 21b. Hence, a current does not flow also into the resistor 22 for full current detection.

In consequence, also in this case, the feedback signal terminal F/B of the control IC 1 becomes almost the ground potential, and the drive of the CCFLs 201 and 202 is stopped.

Next, a modified example of the above-mentioned second structural example will be explained with referring to FIG. 3. In addition, the same reference symbols are assigned to components the same as the components in the structural example shown in FIG. 2, and their detailed explanation is omitted. Hereafter, explanation will be performed with focusing on different points.

Figure 2:
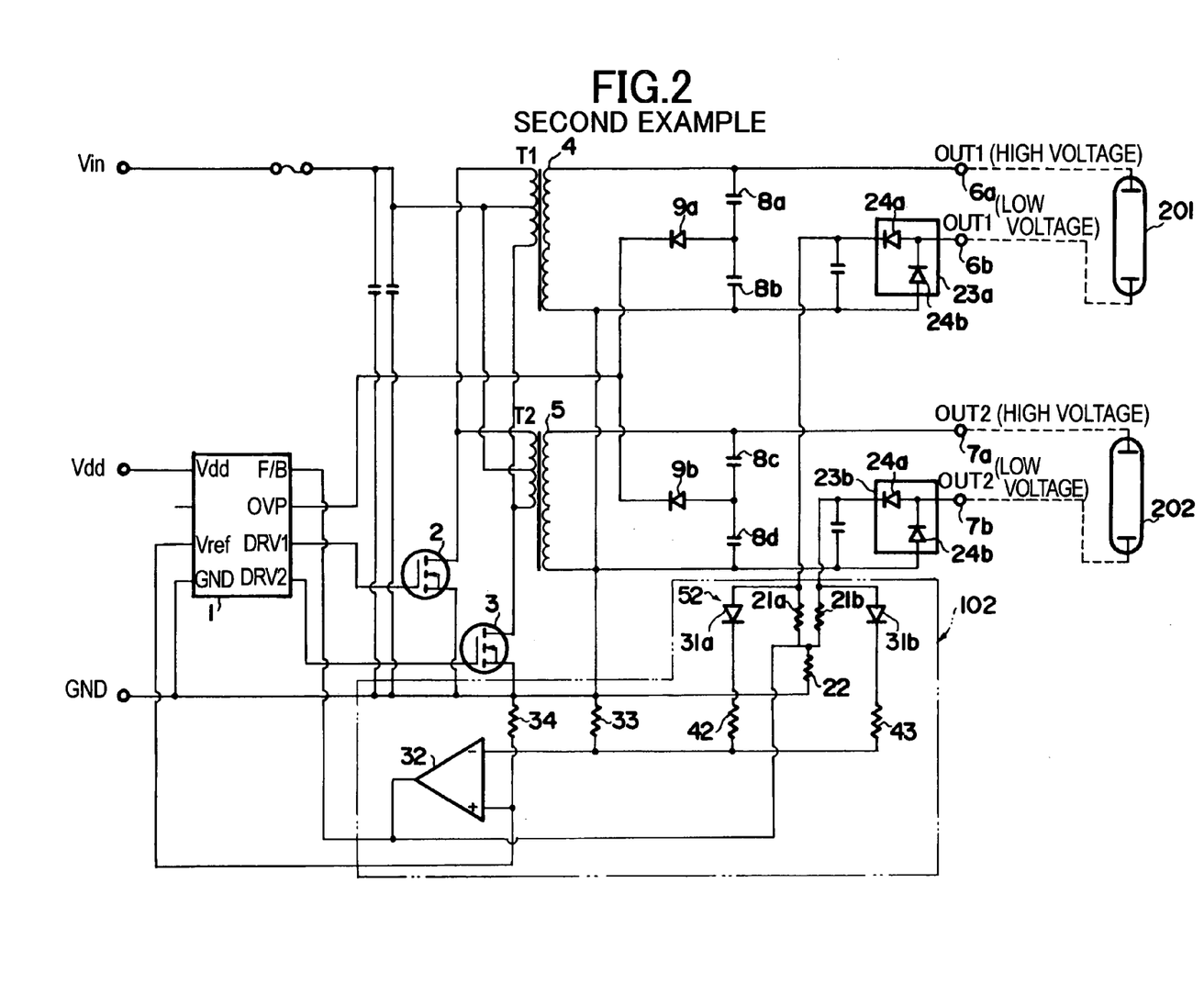
FIG. 2 is a circuit diagram showing a structural example of a discharge lamp driving apparatus according to a second embodiment of the present invention.
Figure 3:
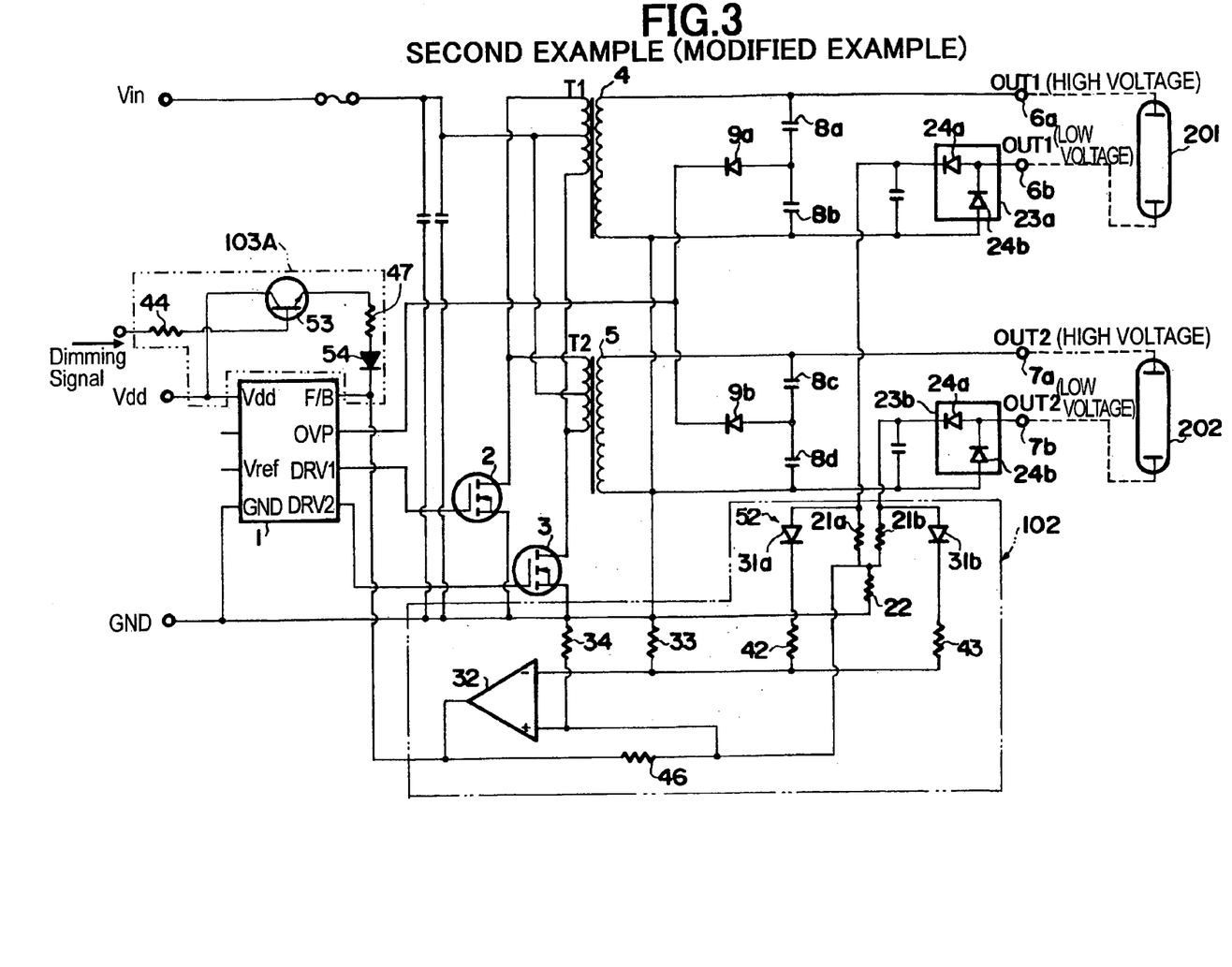
FIG. 3 is a circuit diagram showing a modified example of the discharge lamp driving apparatus according to the second embodiment shown in FIG. 2.

The modified example shown in this FIG. 3 has a feature especially at a respect that a dimming circuit 103A is provided, and the load failure protection circuit 102 is fundamentally almost the same as that of the structure shown in FIG. 2.

The dimming circuit 103A is equipped with a transistor 53, and is constructed so as to directly change amplitude of a feedback signal at the feedback signal terminal F/B of the control IC 1 by a dimming signal from the external.

That is, specifically, while a collector of the transistor 53 is connected to an application terminal of the supply voltage Vdd of the control IC 1, its emitter is connected to one end of a resistor 47. In addition, another end of the resistor 47 is connected to an anode of a diode 54. Then, a cathode of the diode 54 is connected to the feedback signal terminal F/B of the control IC 1.

Furthermore, a dimming signal is applied to a base of the transistor 53 from the external through a resistor 44.

In addition, in this modified example, in connection with the feedback signal being made to be changed by the dimming circuit 103A, in order to make the reference voltage in the non-inverting input terminal of the comparator 32 variable similarly, the common junction of the first and second bypass resistors 21a and 21b, and the resistor 22 for full current detection is connected to the feedback signal terminal F/B of the control IC 1 through a resistor 46. At the same time, the non-inverting input terminal of the comparator 32 is connected to the common junction of the first and second bypass resistors 21a and 21b, and the resistor 22 for full current detection.

In the dimming circuit 103A having such structure, a voltage applied to the feedback signal terminal F/B of the control IC 1 according to the amplitude of the dimming signal applied to the base of the transistor 53 is changed. At the same time, the reference voltage in the non-inverting input terminal of the comparator 32 is also changed according to its voltage change.

Semiconductor devices such as the FETs used in the respective structural examples mentioned above are examples to the last, and it is naturally sufficient to perform structure using other types of semiconductor devices so long as they have similar functions.

In addition, although such structure that drives the FETs 2 and 3 forming a push pull circuit using the control IC 1 is adopted in the structural examples in the embodiment of the present invention, it is naturally not necessary to limit to such structure. For example, a half bridge circuit or a full bridge circuit may be used instead of this push pull circuit, and a discrete circuit having a similar function may be constructed instead of the control IC 1. Furthermore, it is also sufficient to use other circuitry such as a Royer circuit as a drive circuit of the CCFLs 201 and 202.

Moreover, the cases that the two CCFLs 201 and 202 are driven are explained in the above-mentioned embodiments. But, when a control IC which drives three or more CCFLs is used, the same effect as that in the above-mentioned embodiments can be performed by providing bypass resistors corresponding to respective CCFLs in parallel.

In addition, the OVP is not limited to the case that a control IC has an OVP function, but it is also sufficient to perform structure so as to achieve the OVP function by providing another circuit. Furthermore, the dimming circuit 103A is not limited to the structure of the embodiment mentioned above. In connection with it, structure of a circuit portion which sets the reference voltage in the non-inverting input terminal of the comparator 32 may be also changed suitably.

Moreover, when driving other discharge lamp lamps instead of the CCFLs, it is naturally possible to apply the apparatus of the present invention.

As explained above, in the load failure protection circuit and discharge lamp driving apparatus according to this embodiment, parts of currents which flow through respective discharge lamps are made to perform bypass through the bypass resistors which are provided with corresponding to the discharge lamps. At the same time, these currents of the respective bypass resistors are made to flow into one common resistor, and a voltage generated there is made into a feedback signal. Furthermore, the load failure protection circuit is constructed so as to make a feedback signal into a predetermined voltage state forcibly as occurrence of a load failure when a voltage of either of the bypass resistors rises from a voltage at the time of the normal. Hence, differently from the conventional, a voltage change is generated in a corresponding bypass resistor also for load failures such as a short circuit between terminals to which respective discharge lamps are connected, a short circuit between a high voltage side terminal and the ground side, and open connection between terminals. Thereby, it is possible to make the feedback signal into a predetermined voltage corresponding to a load failure. Therefore, it is possible to detect securely a load failure caused in either of the terminals to which discharge lamps are connected to stop drive of the discharge lamps. And it is possible to provide a reliable apparatus which can prevent fuming, firing, and the like of a transformer and the like.

What is claimed is:

1. A load failure protection circuit in a discharge lamp driving apparatus which is constructed so as not only to drive a plurality of discharge lamps on the basis of a feedback signal according to a drive state of the discharge lamps, but also to stop drive of the discharge lamps when the feedback signal becomes a predetermined voltage corresponding to a load failure, the load failure protection circuit comprising:

bypass resistors which are provided corresponding each of the plurality of discharge lamps, and which bypass a part of current which flows through the corresponding discharge lamps;

a resistor for full current detection into which currents which flow through the bypass resistors are made to flow; and a signal voltage setting circuit which not only outputs voltages at a common junction of the bypass resistors and the resistor for full current detection as the feedback signal, but also makes the feedback signal forcibly be a predetermined voltage corresponding to the load failure when any voltage at end parts of the bypass resistors in the discharge lamp sides respectively becomes equal to or more than a predetermined value.

2. The load failure protection circuit according to claim 1, wherein the signal voltage setting circuit is provided for each of the bypass resistors; and wherein the signal voltage setting circuit comprises:

Zener diodes whose cathodes are connected to end parts of the bypass resistors corresponding in discharge lamp sides respectively, and whose anodes are mutually connected to other anodes; and a semiconductor device which is made to be in a conductive state by a Zener voltage when the Zener voltage arises in at least one of the Zener diodes, and is provided so as to make the common junction into a predetermined voltage corresponding to a load failure.

3. The load failure protection circuit according to claim 2, wherein the semiconductor device is constructed of a first transistor and has construction of:

that a base of the first transistor is connected to an anode of each of the Zener diodes through a first resistor;

that an emitter of the first transistor is connected to a ground side;

that a collector of the first transistor is connected through a second resistor to a feedback signal terminal of a control IC and the common junction; and that a third resistor and a capacitor are connected mutually in parallel between the base of the first transistor and the ground side.

4. The load failure protection circuit according to claim 1, wherein the signal voltage setting circuit is provided corresponding to each of the bypass resistors and comprises:

diodes anodes of which are respectively connected to discharge lamp side end parts of the bypass resistors corresponding, and cathodes of which are mutually connected; and a comparator provided so that the common junction may be made into a predetermined voltage corresponding to a load failure when a voltage obtained through a diode is a predetermined voltage larger than a voltage obtained at the time of normal operation of a discharge lamp.

5. The load failure protection circuit according to claim 4, wherein an inverting input terminal of the comparator is connected to each cathode of the diodes through fourth and fifth resistors;

wherein a non-inverting input terminal of the comparator is connected to a reference voltage terminal of a control IC;

wherein an output terminal of the comparator is connected to a feedback signal terminal of the control IC and the common junction;

wherein a sixth resistor is connected between the inverting input terminal and a ground side; and wherein a seventh resistor is connected between the non-inverting input terminal and the ground side.

6. The load failure protection circuit according to claim 5, further comprising a dimming circuit which is constructed so as to be able to make amplitude of a feedback signal in the feedback signal terminal variable according to a dimming signal from the external, wherein the dimming circuit comprises a first diode, an eighth resistor, a ninth resistor, and a second transistor, and has such structure of:

that a collector of the second transistor is connected to a supply voltage application terminal of the control IC;

that an emitter of the second transistor is connected to one end of the eighth resistor;

that another end of the eighth resistor is connected to an anode of the first diode;

that a cathode of the first diode is connected to a feedback signal terminal of the control IC; and that a dimming signal is applied to a base of the second transistor from the external through the ninth resistor; and wherein the comparator and a tenth resistor are connected mutually in parallel between the common junction and the feedback signal terminal of the control IC.

7. A discharge lamp driving apparatus, comprising a load failure protection circuit according to claim 1.

8. The discharge lamp driving apparatus according to claim 7, further comprising a push pull circuit which converts into an AC voltage a DC voltage supplied from the external.

9. The discharge lamp driving apparatus according to claim 7, further comprising a half bridge circuit which converts into an AC voltage a DC voltage supplied from the external.

10. The discharge lamp driving apparatus according to claim 7, further comprising a full bridge circuit which converts into an AC voltage a DC voltage supplied from the external.

* * * * *